United States Patent
Mameri et al.

(10) Patent No.: US 9,760,415 B2
(45) Date of Patent: Sep. 12, 2017

(54) CODE SERVICE FOR LANGUAGE-INDEPENDENT DISPATCH

(71) Applicant: Microsoft Corporation, Redmond, WA (US)

(72) Inventors: Frederico A. Mameri, Seattle, WA (US); Zhenguang Chen, Redmond, WA (US); Shaofeng Zhu, Seattle, WA (US); Michael C. Fanning, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 14/280,560

(22) Filed: May 16, 2014

(65) Prior Publication Data

US 2015/0331727 A1    Nov. 19, 2015

(51) Int. Cl.
G06F 9/54    (2006.01)
G06F 9/44    (2006.01)

(52) U.S. Cl.
CPC ............ *G06F 9/546* (2013.01); *G06F 9/4425* (2013.01); *G06F 9/541* (2013.01); *G06F 9/547* (2013.01)

(58) Field of Classification Search
None
See application file for complete search history.

(56) References Cited

U.S. PATENT DOCUMENTS

| | | |
|---|---|---|
| 6,662,362 B1 | 12/2003 | Arora et al. |
| 6,901,588 B1 | 5/2005 | Krapf et al. |
| 7,634,537 B2 | 12/2009 | Lu |
| 7,814,464 B2 | 10/2010 | Coley et al. |
| 8,060,856 B2 | 11/2011 | Besbris et al. |
| 8,201,185 B2 | 6/2012 | Quinn, Jr. et al. |
| 8,332,828 B2 | 12/2012 | Vargas |
| 2004/0111464 A1* | 6/2004 | Ho et al. ............... 709/203 |
| 2004/0172601 A1* | 9/2004 | Rettig ............ G06F 17/2217 715/249 |

(Continued)

FOREIGN PATENT DOCUMENTS

| | | |
|---|---|---|
| CN | 102880452 A | 1/2013 |
| EP | 2590071 A1 | 5/2013 |

OTHER PUBLICATIONS

"International Search Report and Written Opinion Issued in PCT Patent Application No. PCT/US2015/030686", Mailed Date: Jul. 24, 2015, 10 Pages.

(Continued)

*Primary Examiner* — Tuan Dao (57) ABSTRACT

Disclosed herein are systems, methods, and software to enhance the interoperability of components written in different programming languages. In an implementation, a code service receives a request message communicated by an application component via a message interface in an application environment that is at a layer above a target environment. The request message includes a request to invoke a target component available in the target environment and programmed in a language different from that of the application component. In response to the request, the service identifies at least a service component associated with invoking the target component in the target environment. The service component is executed to invoke the target component via a component interface.

20 Claims, 7 Drawing Sheets (56) References Cited

U.S. PATENT DOCUMENTS

| | | | |
|---|---|---|---|
| 2005/0172299 A1 | 8/2005 | Zhao et al. | |
| 2005/0216727 A1* | 9/2005 | Chattopadhyay | H04L 29/06 713/151 |
| 2007/0180132 A1* | 8/2007 | Purdy | G06F 9/465 709/230 |
| 2007/0283324 A1 | 12/2007 | Geisinger | |
| 2008/0229326 A1* | 9/2008 | Beckwith | G06F 9/465 719/313 |
| 2008/0306751 A1* | 12/2008 | Conroy et al. | 705/1 |
| 2009/0024986 A1 | 1/2009 | Meijer et al. | |
| 2010/0138817 A1 | 6/2010 | Dubinsky et al. | |
| 2011/0138059 A1 | 6/2011 | Schleifer et al. | |

OTHER PUBLICATIONS

"Microsoft Dynamic Language Runtime", Published on: Mar. 8, 2012, Available at: http://dlr.codeplex.com/wikipage?title=0.9%20beta%20release%20notes.

Trinadh, Venkata, "Trinadh's Techforum", Published on: May 27, 2013, Available at: http://www.mytechnoquest.com/2013/05/new-features-in-microsoft-net-framework.html.

Jdhardy, "IronPython", Published on: Sep. 7, 2013, Available at: http://ironpython.codeplex.com/.

"International Preliminary Report on Patentability Issued in PCT Application No. PCT/US2015/030686", Mailed Date: Jul. 25, 2016, 8 Pages.

"Second Written Opinion Issued in PCT Application No. PCT/US2015/030686", Mailed Date: Apr. 12, 2016, 6 Pages.

\* cited by examiner

CODE SERVICE FOR LANGUAGE-INDEPENDENT DISPATCH

TECHNICAL FIELD

Aspects of the disclosure are related to computing hardware and software technology, and in particular, to a code service for interfacing between components.

TECHNICAL BACKGROUND

Software components typically communicate with each other directly through application programming interfaces or application binary interfaces. Such interfaces define the ways in which other components can invoke and interact with a given component. Application programming interfaces are a different type of interface relative to application binary interfaces, although both are avenues through which one component can interact with another component. When components are programmed in different languages they are almost always compiled or interpreted using different compilers and interpreters. This can lead to situations where the interoperability between components is hindered.

For example, components in a library may have been written in C or C++, while components calling into the library may have been written in JavaScript or some other language. The library may have a set of constructs (types, functions, methods, etc.) that are associated with its programming language, but that may create a mismatch when those components interact with other components written in a different language with different constructs. Run-time errors and other irregularities may be kicked-off in such circumstances.

Some solutions to this problem include manually coding the appropriate application programming interface or application binary interface into the source code of the calling components, although this can be tedious and prone to errors. Moreover, maintaining such code to keep up with changes to the component interfaces is a monumental task that unnecessarily consumes development resources.

To alleviate these and other challenges, language-specific dispatchers have been developed that allow a component written in one language to successfully call a component written in another language. For instance, a component written in C# may include a C#-specific dispatcher that runs in the same process and that can interact with a target component. In a separate process associated with a different component written in C++, for example, a separate C++-specific dispatcher may run that can also interact with the target process, and so on for components running in other processes.

OVERVIEW

Provided herein are systems, methods, and software to enhance the interoperability of software components written in different languages.

In an implementation, a code service receives a request message communicated by an application component via a message interface in an application environment that is at a layer above a target environment. The request message includes a request to invoke a target component available in the target environment and programmed in a language different from that of the application component. In response to the request, the service identifies at least a service component associated with invoking the target component in the target environment. The service component is executed to invoke the target component via a component interface.

In some implementations, the code service includes a language-independent dispatcher that handles the invocation of target components and language-specific adapters that translate between the dispatcher and applications calling into the code service.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations disclosed herein enable enhanced interoperability between application components in application environments and target components in target environments. A code service assists by communicating with the application components at a message interface layer and the target components at a component interface layer. The application components may make requests of the code service to invoke the target components, in response to which the code service invokes the target components at the component interface layer using service components.

In at least one implementation, the code service receives a request message communicated by an application component via a message interface. The request message may include a request to invoke a target component available in the target environment and programmed in a language different from that of the application component. In response to the request, the code service identifies a service component associated with invoking the target component in the target environment and runs or executes the service component to invoke the target component via a component interface.

Upon being invoked, the target component executes and may return a result to the service component via the component interface. The code service may communicate a reply message to the application component via the message interface that includes a reply indicative of the result provided by the target component.

In some implementations the application environment may be a web-browser application. Examples of an application component include application code running in the web-browser application, such as a JavaScript application. The target environment may be an operating system and the message interface may be a communication channel between the web-browser and the operating system in some scenarios. Examples of the target component include an object in the operating system and the service component may include code for calling the object. Examples of the communication channel between the web-browser and the operating system include a network request, mapped memory, a hyper-text transfer protocol request, a cryptographic service (such as secure socket layer, or SSL), a web services request, or a web socket communication. Examples of the component interface include an application binary interface and an application programming interface.

The code service may, in some scenarios, include a language-independent dispatcher and various language-specific adapters. Each language-specific adapter receives request messages to invoke target components. Application components written in a different language than the target components may initiate the request messages. The language in which each language-specific adapter is written may differ relative to the language in which the target component is programmed, as well as relative to other languages specifically associated with others of the various language-specific adapters.

The language specific adapters may translate the request messages into requests for a language-independent dispatcher to handle. The language-independent dispatcher may then identify various service components that are associated with or correspond to the target components that are the subject of the request message. The target components may be invoked by running the service components, which communicate or invoke the target components at a component interface level.

In some implementations, the language-specific adapters may be automatically generated at build-time. For instance, when a new target component is developed, various language-specific adapters corresponding to various programming languages can be automatically generated when the new target component is built. The target component and language-specific adapters can then be deployed to a run-time environment in which a language-independent dispatcher is already present. Alternatively, the dispatcher can be deployed at the same time as the new target component and adapters.

Figure 1:
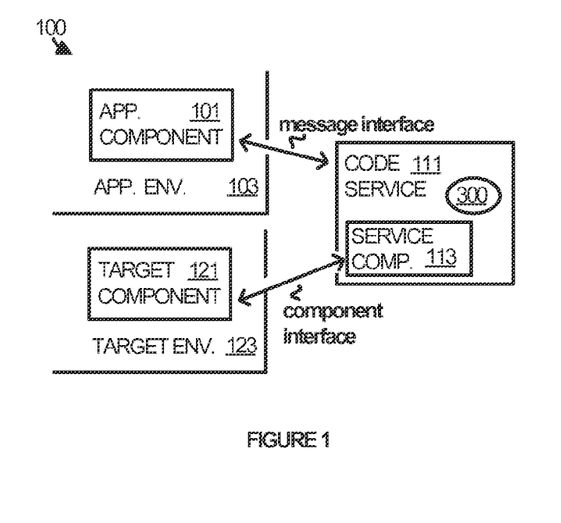
FIG. 1 illustrates an operational architecture in an implementation.
Figure 2:
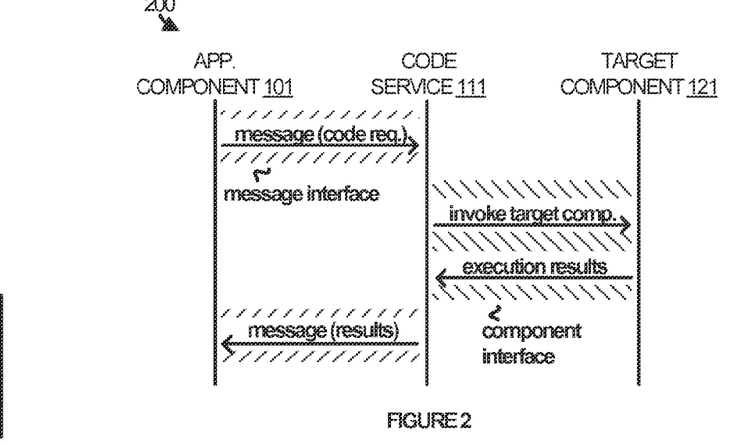
FIG. 2 illustrates an operational scenario in an implementation.
Figure 3:
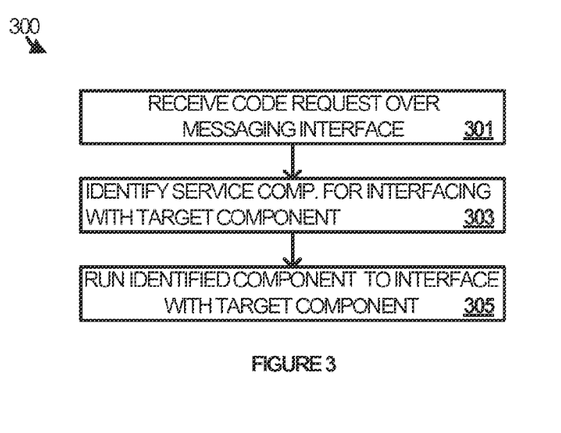
FIG. 3 illustrates an interface process in an implementation.

Referring now to the drawings. FIG. 1 illustrates an operational architecture in which a code service may be employed to facilitate interactions between application components and target components. FIG. 2 illustrates an operational scenario involving the operational architecture, while FIG. 3 illustrates an interface process that may be employed by the code service.

Figure 4:
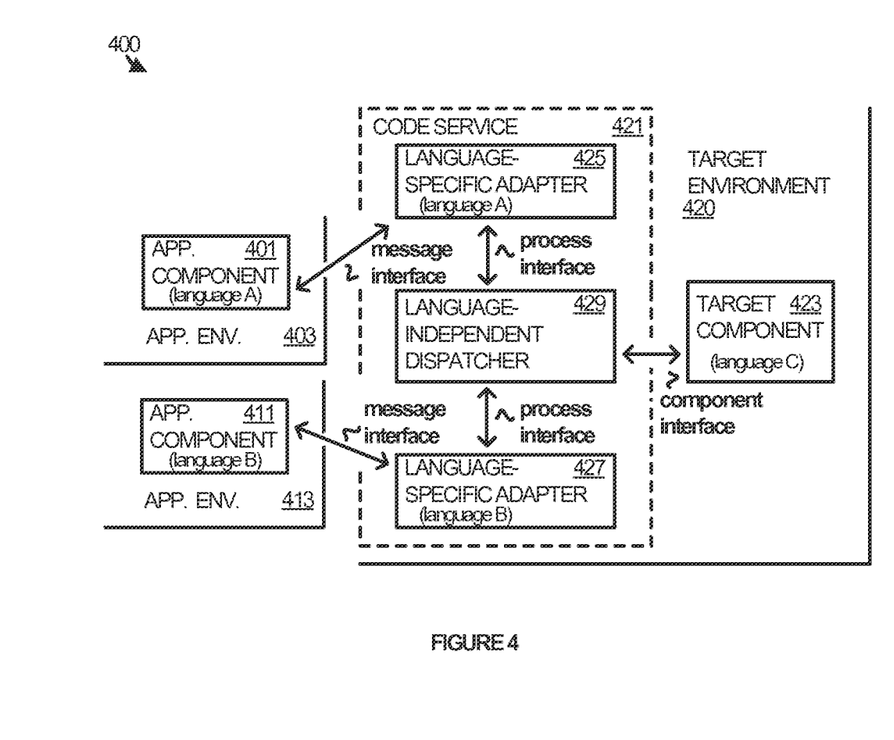
FIG. 4 illustrates an operational architecture in an implementation.
Figure 5:
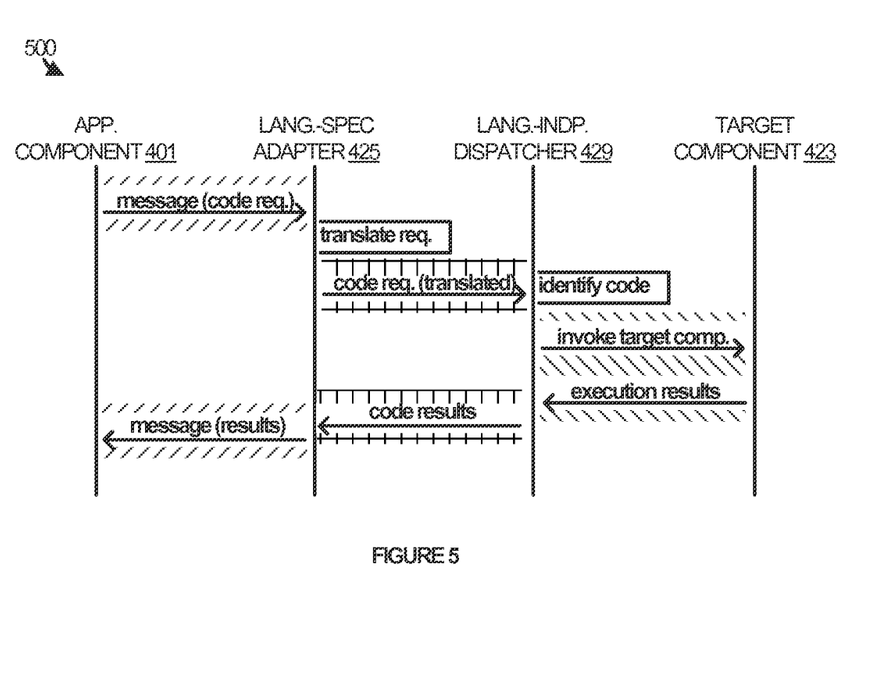
FIG. 5 illustrates an operational scenario in an implementation.
Figure 6:
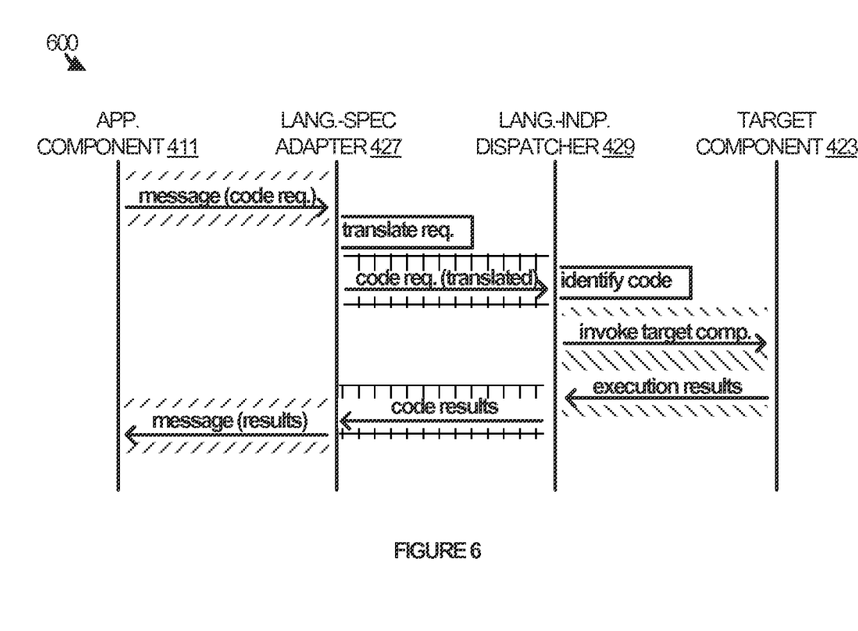
FIG. 6 illustrates an operational scenario in an implementation.
Figure 7:
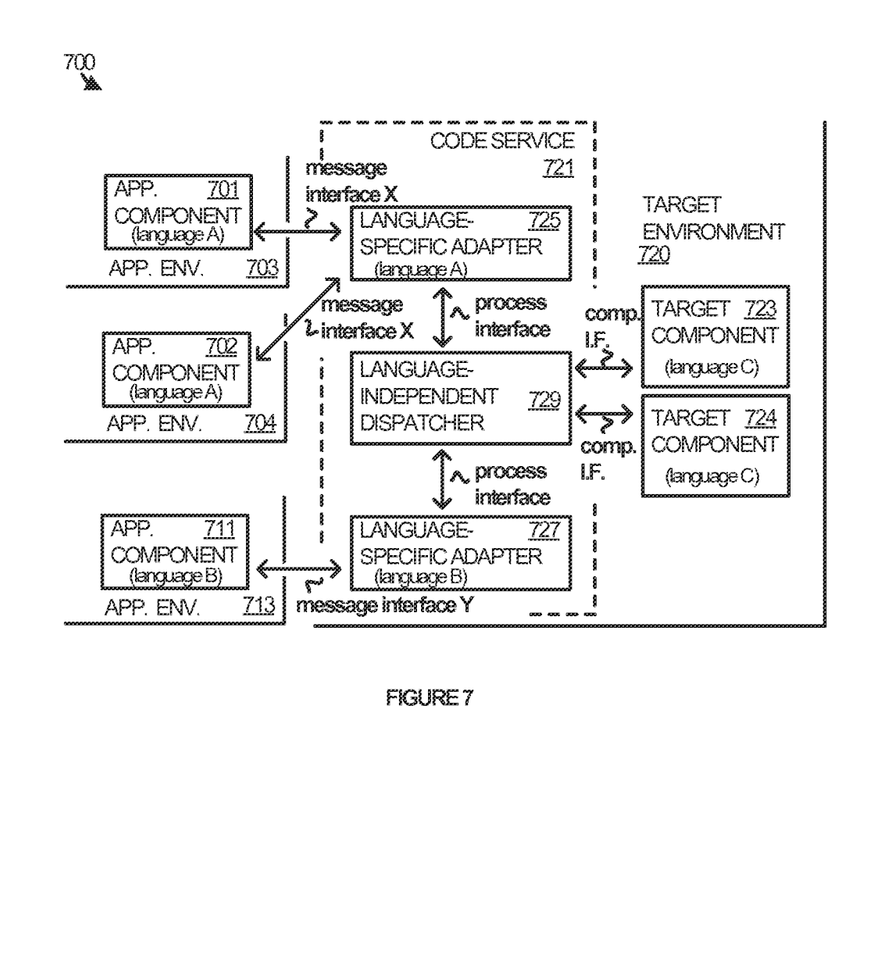
FIG. 7 illustrates an operational architecture in an implementation.
Figure 8:
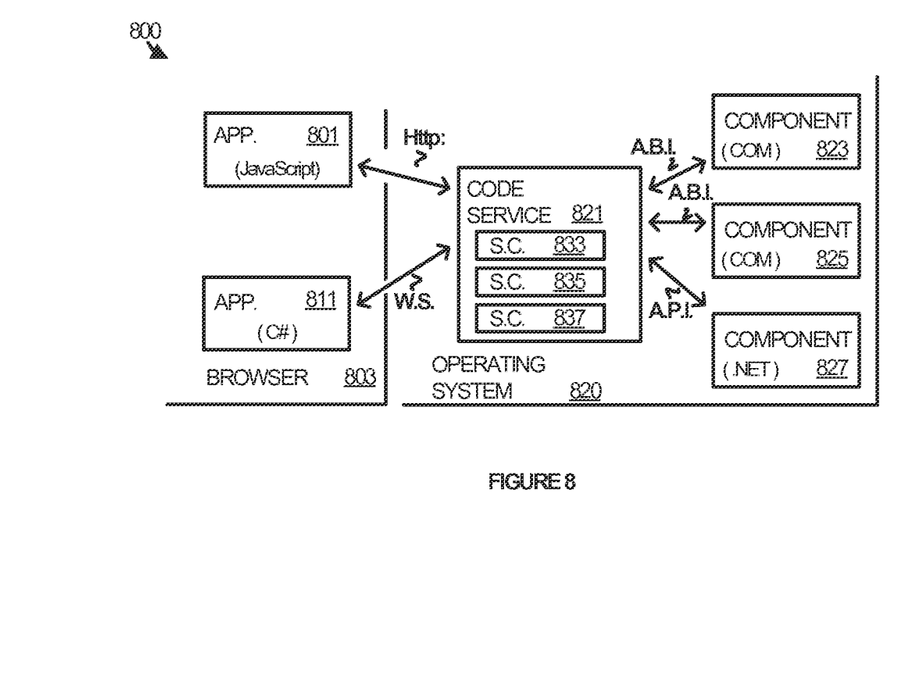
FIG. 8 illustrates an operational architecture in an implementation.
Figure 9:
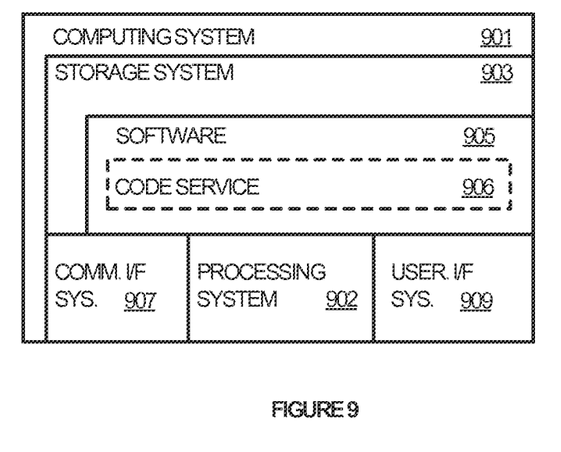
FIG. 9 illustrates a computing system suitable for implementing any of the applications, services, processes, architectures, and operational scenarios disclosed herein with respect to FIGS. 1-8 and discussed below in the Technical Disclosure.

FIG. 4 illustrates another operational architecture that includes language-specific adapters and a language-independent dispatcher. FIG. 5 and FIG. 6 both illustrate an operational scenario involving the adapters and dispatcher, while FIG. 7 and FIG. 8 illustrate additional operational architectures representative of various alternative designs. FIG. 9 illustrates a computing system suitable for implementing any of the applications, services, processes, architectures, and operational scenarios disclosed herein.

Turning now to FIG. 1, operational architecture 100 includes application component 101 in application environment 103. Application component 101 communicates with code service 111 by way of a message interface. Code service 111 includes service component 113, which communicates with target component 121 in target environment 123 by way of a component interface. It may be appreciated that operational architecture 100 may involve other elements and is not limited to just those disclosed herein.

Referring to FIG. 2, in operation application component 101 is invoked in application environment 103 and communicates a request message to code service 111 over a message interface. Code service 111 receives the request message and responsively invokes target component 121 over a component interface using service component 113. Target component 121 runs and returns execution results to code service 111. Code service 111 provides the results over the message interface to application component 101.

It may be appreciated that the fill pattern behind communications exchanged between application component 101 and code service 111 represent a message interface. The different fill pattern behind communications exchanged between code service 111 and target component 121 represents a component interface, which may be a different type of interface than the message interface.

FIG. 3 illustrates interface process 300, which is employed by code service 111 in the context of operational scenario 200. Interface process 300 describes in more detail the function of code service 111 with application component 101 and target component 121.

In operation, code service 111 receives a code request from application component 101 over a message interface (step 301). The request message may include a request of code service 111 to invoke target component 121. For instance, the request message may specify target component 121 explicitly or implicitly, directly or indirectly, or in some other manner. The identity of target component 121 may be wrapped in other information that allows the request to be communicated over the message interface.

Code service 111 responsively attempts to identify a service component associated with target component 121 (step 303), which in this example is represented by service component 113. Identifying service component 113 could be accomplished in a number of ways, including referencing a table or list that stores the names of service components in association with the names of target components. When target component 121 is identified by name in the request message, code service 111 can consult the table or list to identify its corresponding service component.

Service component 113 can then be run in order to invoke target component 121 (step 305). In some scenarios, application component 101 passes parameters in the request message that it communicates to code service 111. Service component 113 may pass the parameters on to target component 121 when it is called. In some scenarios, service component 113 may include code that is relevant to target component 121 and that allows it to invoke target component 121. However, in other scenarios service component 113 may be called upon to locate and retrieve the relevant code for calling target component 121. In still other scenarios, service component 113 may not yet be instantiated at the time application component 101 calls into code service 111. Rather, code service 111 may be called upon to instantiate service component 113. In any case, target component 121 can execute based at least in part on the parameters and can return results to code service 111.

In this manner, application component 101 may successfully invoke target component 121, even though each component may have been written in different programming languages. Application component 101 is able to do so by communicating with code service 111 via a message interface, while code service 111 communicates with target component 121 via a lower layer interface, or component interface. Such technologies enhance the interoperability of components in diverse environments.

Referring back to FIG. 1, application component 101 is representative of any code, module, application, or collection thereof that runs in the context of application environment 103 and that is capable of communicating with code service 111 over a message interface. Application component 101 may be part of a larger application that runs within the context of application environment 103. Examples of application environment 103 includes web browser applications, operating systems, virtual machines, Java virtual machines, or any combination or variation thereof.

Target component 121 is representative of any code, module, application, or collection thereof that runs in the context of target environment 123 and that is capable of being called by service component 113. Examples of target component 121 include, but are not limited to, component object model (COM) objects, .NET objects, C objects, C++ objects, or any other type of component. Examples of target environment 123 include, but are not limited to, operating systems, virtual machines. Java virtual machines, other web browsers, or any combination or variation thereof.

Code service 111 is representative of any code, component, module, application, or collection thereof, or any other type of software, capable of interfacing with application component 101 and launching service component 113. Code service 111 may be implemented in target environment 123 in some scenarios, but may also be implemented outside of target environment 123.

Operational architecture 100 may be implemented on a single computing device or distributed across multiple computing devices. Computing system 901 is representative of one suitable platform and is discussed in more detail below.

FIG. 4 illustrates operational architecture 400 in an implementation. Operational architecture 400 includes application component 401 in application environment 403 and application component 411 in application environment 413. Application component 401 and application component 411 communicate with code service 421 in target environment 420 by way of message interfaces. Application component 401 may use the same or a different message interface as application component 411. Code service 421 interfaces with target component 423 via a component interface or interfaces.

Code service 421 includes language-specific adapter 425 associated with application components written in one language (language A) and also includes another language-specific adapter 427 associated with application components written in another language (language B). Language-specific adapter 425 handles request messages initiated by application components written in the one language, such as application component 401, while language-specific adapter 427 handles request messages handled in another language, such as application component 411.

A language-independent dispatcher 429 is also included in code service 421. Language-independent dispatcher 429 interfaces between language-specific adapters 425 and 427 and target component 423. Language-specific adapter 425 and language-specific adapter 427 both run as part of the same process as language-independent dispatcher 429 and thus communicate with language-independent dispatcher 429 via a process interface or in some other inter-process manner distinct from a message interface. In other words, application components 401 and 411 do not run as part of the same process as language-specific adapters 425 and 427 and language-independent dispatcher 429. In many situations, target component 423 also runs as part of a separate process in memory.

Referring to FIG. 5, operational scenario 500 involves application component 401 to demonstrate representative data flow in an implementation. In operation, application component 401 is invoked in application environment 403 and communicates a request message to language-specific adapter 425 in code service 421 over a message interface. Language-specific adapter 425 receives and processes the message, including unwrapping it to access a code request included therein. The code request identifies a specific target component that application component 401 is attempting to call and also includes parameters with which to call component.

Language-specific adapter 425 translates the code request into a format understood by language-independent dispatcher 429 and forwards the request in-process to language-independent dispatcher 429. Language-independent dispatcher 429 receives the code request and responsively looks-up which service component (not shown) to use to reach target component 423. A table, list, or other such data structure consulted by language-independent dispatcher 429 may define or otherwise specific which service components are associated with which target components.

Upon identifying the appropriate service component, language-independent dispatcher 429 runs the service component to invoke target component 423. The service component may be written in the same language as target component 423 (language C) to ensure sufficient interoperability between components. The service component is loaded with the parameters provided by application component 401 to allow target component 423 to execute against the parameters.

Target component 423 returns execution results to language-independent dispatcher 429, which passes the results to language-specific adapter 425. Language-specific adapter 425 generates a reply message that includes the execution results, or code results, and communicates the reply message over the message interface to application component 401.

It may be appreciated that the fill pattern behind communications exchanged between application component 401 and language-specific adapter 425 represents a message interface. The different fill pattern behind communications exchanged between language-specific adapter 425 and language-independent dispatcher represents a process interface, or in-process communications. Yet another fill pattern behind communications exchanged between language-independent dispatcher 429 and target component 423 represent a component-level interface, or that language-independent dispatcher 429 and target component 423 communicate across processes.

Operational scenario 600, illustrated in FIG. 6, involves application component 411 to demonstrate a representative data flow in another implementation. FIG. 5 and FIG. 6 together illustrate that language-independent dispatcher 429 is capable of interacting with multiple language-specific adapters and thus can enable interoperability between application components written in different programming languages relative to each other (language A and language B) and a target component written in yet another programming language (language C).

In operation, application component 411 is invoked in application environment 413 and communicates a request message to language-specific adapter 427 over a message interface. Language-specific adapter 427 receives and processes the message, including unwrapping it to access a code request included therein. The code request identifies a specific target component that application component 411 is attempting to call and also includes parameters with which to call component.

Language-specific adapter 427 translates the code request into a format understood by language-independent dispatcher 429 and forwards the request in-process to language-independent dispatcher 429. Language-independent dispatcher 429 receives the code request and responsively looks-up which service component (not shown) to use to reach target component 423.

Upon identifying the appropriate service component, language-independent dispatcher 429 runs the service component to invoke target component 423. The service component may be written in the same language as target component 423 (language C) to ensure sufficient interoperability between components. The service component is loaded with the parameters provided by application component 411 to allow target component 423 to execute against the parameters.

Target component 423 returns execution results to language-independent dispatcher 429, which passes the results to language-specific adapter 427. Language-specific adapter 427 generates a reply message that includes the execution results, or code results, and communicates the reply message over the message interface to application component 411.

It may be appreciated that the fill pattern behind communications exchanged between application component 411 and language-specific adapter 427 represents a message interface. The different fill pattern behind communications exchanged between language-specific adapter 427 and language-independent dispatcher 429 represents a process interface, or in-process communications. Yet another fill pattern behind communications exchanged between language-independent dispatcher 429 and target component 423 represent a component-level interface, or that language-independent dispatcher 429 and target component 423 communicate across processes.

Referring back to FIG. 4, application component 401 is representative of any code, module, application, or collection thereof that runs in the context of application environment 403 and that is capable of communicating with code service 421 over a message interface. Application component 401 may be part of a larger application that runs within the context of application environment 403. Examples of application environment 403 includes web browser applications, operating systems, virtual machines, Java virtual machines, or any combination or variation thereof.

Application component 411 is representative of any code, module, application, or collection thereof that runs in the context of application environment 413 and that is capable of communicating with code service 4211 over a different message interface than application component 401. Application component 411 may be part of a larger application that runs within the context of application environment 413. Examples of application environment 413 include web browser applications, operating systems, virtual machines, Java virtual machines, or any combination or variation thereof. Application environment 413 may be separate from application environment 403 in some scenarios, but in other scenarios could be combined such that application component 401 and application component 411 execute within the context of the same application environment.

Target component 423 is representative of any code, module, application, or collection thereof that runs in the context of target environment 420 and that is capable of being called by code service 421. Examples of target component 423 include, but are not limited to, component object model (COM) objects, .NET objects, C objects, C++ objects, or any other type of component. Examples of target environment 420 include, but are not limited to, operating systems, virtual machines, Java virtual machines, other web browsers, or any combination or variation thereof.

Code service 421 is representative of any code, component, module, application, or collection thereof, or any other type of software, capable of interfacing with application component 401 and application component 411 and launching a service component to invoke target component 423. Code service 421 may be implemented in target environment 420 in some scenarios, but may also be implemented outside of target environment 420.

Operational architecture 400 may be implemented on a single computing device or distributed across multiple computing devices. Computing system 901 is representative of one suitable platform and is discussed in more detail below.

FIG. 7 illustrates another operational architecture 700, which is representative of an alternative design relative to operational architecture 400. Operational architecture 700 includes application component 701 hosted in application environment 703, application component 702 hosted in application environment 704, and application component 711 hosted in application environment 713.

Application component 701 and application component 702 communicate with code service 721 over a first message interface (message interface X). Application component 711 communicates with code service 721 over a different, second message interface (message interface Y).

The different message interfaces correspond to the different language-specific adapters available in code service 721, represented by language-specific adapter 725 and language-specific adapter 727. Language-specific adapter 725 corresponds to a first programming language (language A) and generally handles request messages initiated by application components programmed in that language. Language-specific adapter 727 corresponds to a second programming language (language B) and generally handles request messages initiated by application components programmed in that language.

Language specific adapter 725 and language-specific adapter 727 both communicate in-process with language-independent dispatcher 729. Language-independent dispatcher 729 communicates over various component interfaces with target component 723 and target component 724. Target component 723 and target component 724 are representative of components that may be loaded in target environment 720.

In operation, when application component 701 is invoked, it may communicate a request message to language-specific adapter 725 over the first message interface in order to cause a target component to be invoked. Likewise, application component 702 also communicates request messages to language-specific adapter 725 when it needs to invoke a target component in target environment 720. This is because both application components 701 and 702 may be programmatically directed to interact with language-specific adapter 725. Optionally, other elements in application environment 703 or application environment 704 may be programmatically directed in this manner.

Language-specific adapter 725 receives and processes the request messages, including unwrapping them to access code requests included therein. The code requests identify specific target components that the application components may be attempting to call and also include parameters with which to call the components. Language-specific adapter 725 translates the code requests into a format understood by language-independent dispatcher 729 and provides the requests in-process to language-independent dispatcher 729. Language-independent dispatcher 729 receives the code requests and responsively looks-up which service component or components (not shown) to use to reach the target component identified by each request message.

Upon identifying the appropriate service components, language-independent dispatcher 729 runs the service components to invoke the target components, which could be either one or both of target component 723 or target component 724 in this example. The service components may be written in the same language as the target components (language C) to ensure sufficient interoperability between components. The service components are loaded with parameters provided by application components 701 and 702 to allow the target components to execute against the parameters.

The target components return execution results to language-independent dispatcher 729, which passes the results to language-specific adapter 725. Language-specific adapter 725 generates reply messages that include the results and communicates the reply messages over the message interface to application components 701 and 702.

Application component 711 interacts somewhat differently with code service 721 in that it uses a different message interface (message interface Y) to communicate with language-specific adapter 727. In operation, application component 711 communicates a request message to language-specific adapter 727 over the second message interface in order to cause a target component to be invoked. This is because application components 710 may be programmatically directed to interact with language-specific adapter 727. Optionally, other elements in application environment 713 may be programmatically directed to send request messages to language-specific adapter 727 on behalf of application component 711.

Language-specific adapter 727 receives and processes the request message, including unwrapping the message to access a code request included therein. The code request identifies a specific target component that application component may be attempting to call and may also include parameters with which to call the component. Language-specific adapter 727 translates the code request into a format understood by language-independent dispatcher 729 and provides the request in-process to language-independent dispatcher 729. Language-independent dispatcher 729 receives the code request and responsively looks-up which service component or components (not shown) to use to reach the target component identified by the request message.

Upon identifying the appropriate service component, language-independent dispatcher 729 runs the service component to invoke the target component, which could be either one of target component 723 or target component 724 in this example. The service component may be written in the same language as the target component (language C) to ensure sufficient interoperability between components. The service component is loaded with parameters provided by application component 711 to allow the target component to execute against the parameters.

The target component returns execution results to language-independent dispatcher 729, which passes the results to language-specific adapter 727. Language-specific adapter 727 generates a reply message that includes the results and communicates the reply message over the second message interface to application component 711.

FIG. 8 illustrates another operational architecture 800 in an implementation. Operational architecture 800 includes application 801 running in browser 803, as well as application 811 running in browser 803. It may be appreciated that additional instances of browser 803 are possible or other application environments could be used to host one or both of application 801 and application 811.

Application 801 is programmed in JavaScript and thus is programmatically directed to communicate over one particular message interface with code service 821 running in operation system 820. Application 811 is programmed in C# and thus is programmatically directed to communicate over a different message interface with code service 821. In this example implementation, application 801 communicates with code service 821 via a hyper-text transfer protocol (HTTP) channel while application 811 communicates over a Web Socket channel. Other channels, paths, or message interfaces are possible and may be considered within the scope of the present disclosure, examples of which include TLS, SSL, HTTP, JSON, and SOAP communications.

Code service 821 includes various service components represented by service component 833, service component 835, and service component 837. Each service component corresponds to a particular one of various target components in operation system 820, represented by component 823, component 825, and component 827. It may be appreciated that each of the target components are written languages that different relative the languages in which application 801 and application 811 are written. Service components 831, 833, and 835 provide bridges to components 823, 825, and 827 at the component interface level. For instance, service components 833 and 835 communicate respectively with components 823 and 825 over application binary interfaces. Service component 837 communicates with component 827 over an application programming interface.

In a brief operational example, one of the applications 801 and 811 in browser 803 may communicate a request message over one of the message interfaces to code service 821. Code service 821 receives the message and identifies an appropriate service component to use to invoke a target component identified in the request message. Code service 821 then launches the service component in order to invoke the target component. Parameters included in the request message may be passed by the service component for the target component to execute against. The target component runs and, where applicable, returns results that can be communicated by code service 821 in a reply message to the initiating application.

FIG. 9 illustrates computing system 901 that is representative of any system or collection of systems in which the various operational architectures, scenarios, and processes disclosed herein may be implemented. Examples of computing system 901 includes, but is not limited to, smart phones, laptop computers, tablet computers, desktop computers, hybrid computers, gaming machines, virtual machines, smart televisions, and watches and other wearable devices, as well as any variation or combination thereof. Other examples include server computers, rack servers, web servers, cloud computing platforms, and data center equipment, as well as any other type of physical or virtual server machine, and any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes at least code service 906, which is representative of code service 111, code service 421, code service 721, and code service 821 discussed with respect to the foregoing implementations. When executed by processing system 902 to enhance the described herein for at least the various processes, operational scenarios, and sequences interoperability of components, software 905 directs processing system 902 to operate as discussed in the foregoing implementations with respect to code service 111, code service 421, code service 721, and code service 821. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing a code service and its associated functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software or other application software. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system customized to facilitate enhanced component interoperability. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Referring again to FIGS. 1-3 as an example, through the operation of a computing system or systems of which computing system 901 is representative, transformations may be performed with respect to operational architecture 100, and target component 121 in particular. As an example, target component 121 may be in a state where it is not invoked. Upon application component 101 submitting a request message to code service 111, service component 113 is identified and launched to invoke target component 121, thereby changing its state to a new, invoked state.

It may be understood that computing system 901 is generally intended to represent a computing system or systems on which software 905 may be deployed and executed in order to implement enhanced component interoperability. However, computing system 901 may also be suitable as any computing system on which software 905 may be staged and from where one or both may be distributed, transported, downloaded, or otherwise provided to yet another computing system for deployment and execution, or yet additional distribution.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

While FIGS. 1-9 generally depict relatively few operational scenarios and sequences, it may be appreciated that the concepts disclosed herein may be applied at scale and routinely. For example, the code services disclosed herein could be deployed in support of any number of application components and target components.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
   one or more computer readable storage media; and
   program instructions stored on the one or more computer readable storage media and comprising a code service that, when executed by a processing system implemented within a single processing device, directs the processing system to at least:
   receive a request message communicated by an application component via a message interface in an application environment hosted by the processing system at a layer above a target environment hosted by the processing system, wherein the request message comprises a request to invoke a target component available in the target environment and programmed in a language different from that of the application component;
   in response to the request, identify at least a service component associated with invoking the target component in the target environment; and
   run the service component to invoke the target component via a component interface.

2. The apparatus of claim 1 wherein the code service further directs the code service to, in response to the target component returning at least a result via the component interface after having been invoked, communicating a reply message to the application component via the message interface that comprises a reply indicative of at least the result.

3. The apparatus of claim 2:
   wherein the application environment comprises a browser application and the application component comprises application code running in the browser application;
   wherein the target environment comprises an operating system;

wherein the message interface comprises a communication channel between the browser application and the operating system;

wherein the target component comprises an object in the operating system; and wherein the service component comprises code for calling the object.

4. The apparatus of claim 3 wherein the communication channel between the browser application and the operating system comprises one of a network request, mapped memory, a hyper-text transfer protocol request, a cryptographic service, a web service, or a web socket.

5. The apparatus of claim 4 further comprising the processing system configured to execute the program instructions, and wherein the component interface comprises one of an application binary interface or an application programming interface.

6. The apparatus of claim 1 wherein the code service comprises a language-independent dispatcher and a plurality of language-specific adapters, wherein each language-specific adapter, when executed by the processing system, directs the processing system to:

receive request messages to invoke a plurality of target components, the request messages initiated by a plurality of application components programmed in a different language relative to the language in which the target component is programmed and specifically associated with the language-specific adapter relative to other languages specifically associated with others of the plurality of language-specific adapters; and translate the request messages into a plurality of code requests for the language-independent dispatcher to handle.

7. The apparatus of claim 6 wherein the language-independent dispatcher, when executed by the processing system, directs the processing system to receive the plurality of code requests, identify a plurality of service components associated with a plurality of the target components, and invoke a plurality of target components using the plurality of service components.

8. A method of operating a code service comprising:

receiving a request message communicated by an application component via a message interface in an application environment hosted by a processing system at a layer above a target environment hosted by the processing system, wherein the processing system is implemented within a single processing device, wherein the request message comprises a request to invoke a target component available in the target environment and programmed in a language different from that of the application component;

in response to the request, identifying at least a service component associated with invoking the target component in the target environment; and executing the service component to invoke the target component via a component interface.

9. The method of claim 8 wherein the method further comprises, in response to the target component returning at least a result via a component interface after having been invoked, communicating a reply message to the application component via the message interface that comprises a reply indicative of at least the result.

10. The method of claim 9:

wherein the application environment comprises a browser application and the application component comprises application code running in the browser application;

wherein the target environment comprises an operating system;

wherein the message interface comprises a communication channel between the browser application and the operating system;

wherein the target component comprises an object in the operating system; and wherein the service component comprises code for calling the object.

11. The method of claim 10 wherein the communication channel between the browser application and the operating system comprises one of a network request, mapped memory, a hyper-text transfer protocol request, or a web socket.

12. The method of claim 11 wherein the component interface comprises one of an application binary interface or an application programming interface.

13. The method of claim 8 wherein the code service comprises a language-independent dispatcher and a plurality of language-specific adapters and wherein the method further comprises:

receiving request messages to invoke a plurality of target components, the request messages initiated by a plurality of application components programmed in a different language relative to the language in which the target component is programmed and that is specifically associated with the language-specific adapter relative to other languages specifically associated with others of the plurality of language-specific adapters; and translating the request messages into a plurality of code requests for the language-independent dispatcher to handle.

14. The method of claim 13 wherein the method further comprises the language-independent dispatcher receiving the plurality of code requests, identifying a plurality of service components associated with a plurality of the target components, and invoking a plurality of target components using the plurality of service components.

15. One or more computer readable storage media having stored thereon program instructions for interfacing between application components in an application environment and target components in a target environment, the program instructions comprising:

a plurality of language-specific adapters, wherein each of the language-specific adapter corresponds to a different language of a plurality of programming languages and, when executed by a processing system implemented within a single processing device, at least:

receives, via a message interface available between the application environment hosted by the processing system and the target environment hosted by the processing system, request messages initiated by a subset of the application components to invoke at least a subset of the target components, wherein the subset of the application components also correspond to the different language and wherein the request messages identify the subset of the target components and parameters to be passed to the subset of the target components; and translate the request messages into code requests that identify the subset of the target components and the parameters; and a language-independent dispatcher in communication with the plurality of language-specific adapters that, when executed by the processing system, identifies service components corresponding to the subset of the target components and invokes the subset of the target components via component interfaces using the service components and the parameters.

16. The computer readable storage media of claim 15 wherein the language-independent dispatcher, when further executed by the processing system, receives results from the target components, generates code replies indicative of at least the replies, and communicates the code replies to the language-specific adapter.

17. The computer readable storage media of claim 15 wherein the application environment comprises a browser application and wherein the application components comprises components of applications running in the browser applications.

18. The computer readable storage media of claim 17 wherein the target environment comprises an operating system and wherein the target components comprise operating system components.

19. The computer readable storage media of claim 18 wherein the message interface comprises a bi-directional communication channel between the browser application and the operating system.

20. The computer readable storage media of claim 18 wherein each of the component interfaces comprises one of an application programming interface or an application binary interface.

* * * * *